3,701,749
POLYVINYLIDENE FLUORIDE-FLAVANTHRON
COMPOSITION
Masahiro Segawa and Yukichika Kawakami, Iwaki, Japan, assignors to Kureha Kagaku Kogyo Kabushiki Kaisha, Tokyo-to, Japan
Filed Apr. 2, 1971, Ser. No. 130,673
Claims priority, application Japan, Apr. 7, 1970, 45/29,515
Int. Cl. C08f 29/16
U.S. Cl. 260—41 C
3 Claims

ABSTRACT OF THE DISCLOSURE

Polyvinylidene fluoride composition of improved crystallinity and impact strength containing flavanthron as a crystal nucleating agent.

Figure 1:
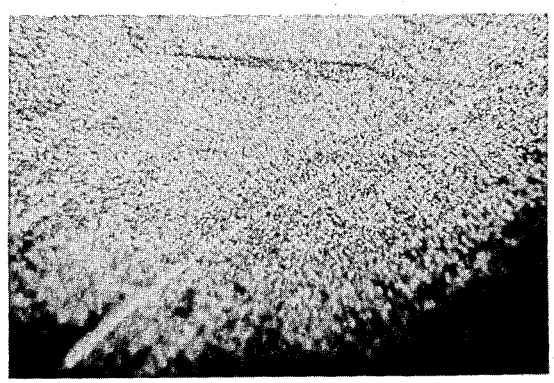

This invention relates to polyvinylidene fluoride (abbreviated as "PVDF") composition having improved crystallinity. More particularly, it is concerned with polyvinylidene fluoride composition containing therein a quantity of flavanthron as a crystal nucleating agent.

As has already been known, polyvinylidene fluoride is exceedingly superior in its anti-aging property, anti-contamination property to any other sorts of plastic material. Besides these favorable properties, the synthetic resin also possesses various characteristics such as high mechanical strength, wear-resistant property, chemical-resistant property, high thermal deformation temperature, extremely good machinability, and so forth. On account of this, it has drawn increasing attention of all concerned in various technical fields such as mechanical engineering, electrical engineering, chemical engineering, architectural engineering, etc., who wish to utilize it as the raw material in each field of the industry.

However, as the polyvinylidene fluoride is highly crystalline, it produces very fine crystals of less than 1 micron in diameter when rapidly cooled or quenched. On the other hand, when the material is cooled gradually, coarse spherulites of 50 microns in diameter, or, in an extreme case, 100 microns in diameter or so, inevitably occur. In order to control generation of internal strains in shaped articles to be obtained from the PVDF material to a minimum possible degree, it is recommended that the polyvinylidene fluoride material be gradually cooled after it is molten and processed, although there tends to appear a defect such as hair-cracks among the spherulites created.

On the other hand, as the plastic material in general has low heat conductivity, even when it is cooled rapidly, the effect of such rapid cooling extends only to a range of 0.5 mm. from the surface part thereof, and, at a portion deeper than this, spherulites grow inevitably. Also, the rapid cooling tends to cause the internal strains more easily as well as to accelerate generation of nesting in the interior of the shaped articles.

It is therefore an object of the present invention to provide polyvinylidene fluoride which is capable of causing uniformly fine spherulites to create throughout a formed structure to be obtained from the material, i.e., from its surface to the interior thereof, even if the structure is gradually cooled after it is molten and processed.

It is another object of the present invention to provide polyvinylidene fluoride having improved impact strength.

The foregoing objects and other objects of the present invention as well as the principle thereof will become more apparent from the following detailed description when read in conjunction with the accompanying drawing and preferred examples thereof.

Figure 2:
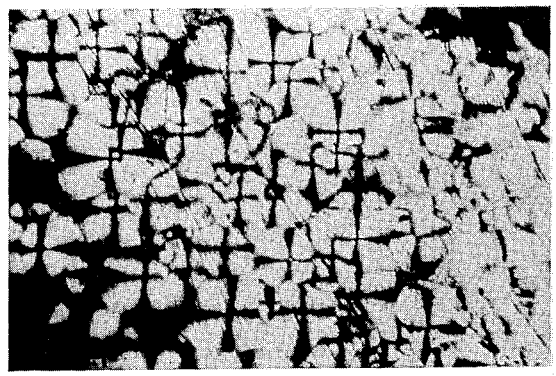

In the drawing:

FIG. 1 is a micro-photograph through a polarization microscope (magnification: ×100) of a sliced specimen of polyvinylidene fluoride film according to the present invention which has been gradually cooled after it is molten and processed; and FIG. 2 is another microphotograph taken of polyvinylidene fluoride film of ordinary quality.

As the results of various studies and experiments to obtain polyvinylidene fluoride of such improved crystallinity and impact strength, it has been found out that addition of flavanthron to polyvinylidene fluoride is remarkably effective for the purpose.

Polyvinylidene fluoride to be used in the present invention may be any one obtained by any polymerization method such as suspension-polymerization, emulsion-polymerization, solution-polymerization, and others. Also, not only homopolymer of vinylidene fluoride but also copolymers containing therein more than 90 mol percent of vinylidene fluoride and having essentially equal properties with the homopolymer are useful for the purpose of the present invention. For monomers copolymerizable with vinylidene fluoride, there are tetrafluoroethylene, hexafluoropropylene, monochloro-trifluoroethylene, vinyl fluoride, etc.

Flavanthron which acts as the crystal nucleating agent in the polyvinylidene fluoride composition according to the present invention is a compound having the following structural formula, a product of Ciba & Cie, Switzerland, and available in general market under the trademark "Chromofuthal Yellow–A2R."

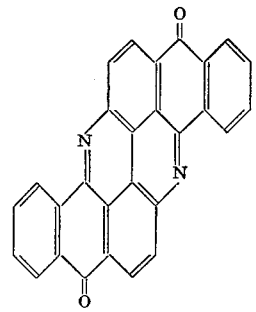

The content of flavanthron in 100 parts by weight of polyvinylidene fluoride requires to be more than 0.01 part by weight. No effects as the crystal nucleating agent can be recognized with the content of less than 0.01 part by weight. In particular, with the content of 0.05 part by weight or more of flavanthron, uniform, fine spherulites would always result, however slow the cooling operation may be. Sufficient effect as the crystal nucleating agent can be attained with a content of up to 0.2 part by weight or so. However, adding quantity of this compound may be further increased up to 20 parts by weight with a view to using it as a filler, extender, and other purposes, the nucleating effect being attained simultaneously.

Addition of flavanthron to polyvinylidene fluoride can be done by various methods. For example, flavanthron in powder form is admixed with polyvinylidene fluoride powder, and made into extrusion-pellets by an extruder, the resultant composition being suitable for shaping processes. Also, in case of using polyvinylidene fluoride in powder form, it is sufficient to simply admix flavanthron powder with the PVDF powder. However, for the sake of more perfect and uniform dispersion of flavanthron into polyvinylidene fluoride, it is recommended, for instance, that 20 parts by weight of flavanthron, 170 parts by weight of methyl-isobutylphthalate, and 30 parts by weight of di-isobutyl-ketone are sufficiently kneaded in a ball-mill to be made into paste, and then a required quantity of this paste is added to polyvinylidene fluoride powder and mixed therewith by an appropriate blending apparatus at a temperature of 80° C. or so. Furthermore, it is possible to add a required quantity of flavanthron to vinylidene fluoride monomer at the time of polymerization thereof, which readily provides the polyvinylidene fluoride composition according to the present invention upon completion of the polymerization.

The polyvinylidene fluoride composition in pellet obtained by the above-described manner produces spherulites of a uniform size of 1 micron or smaller in diameter throughout a shaped article, even when the composition is shaped into an article of heavy thickness and subjected to gradual cooling. The shaped article also shows increased impact strength which is approximately 50% as high as that of polyvinylidene fluoride composition containing no flavanthron.

The polyvinylidene fluoride composition in powder obtained by the above-described manner also produces uniform, fine spherulites throughout a coated film when it is used for powder-coating on various appliances, where it is cooled extremely slowly so as to avoid generation of strains within the coated film. Consequently, the coated film is not only least in its internal strain, but also corrosion-resistant with sufficient prevention of chemicals from permeating through the coated film.

In order to enable a skilled person in the art to reduce the present invention into practice, the following actual examples are presented. It should, however, be noted that these examples are illustrative only and do not intend to limit the scope of protection as recited in the appended claims.

EXAMPLE 1

The following compounds were charged into a ball-mill and kneaded for 24 hours to prepare paste of flavanthron.

| Constituent: | Parts by wt. |
| --- | --- |
| Flavanthron | 20 |
| Methyl-isobutyl-phthalate | 170 |
| Di-isobutyl-ketone | 30 |

To 100 parts by weight of polyvinylidene fluoride having inherent viscosity $\eta_{inh}$ of 1.01 and obtained by the suspension-polymerization at 25° C., particle size of which ranges from 150 to 350 mesh, the above-mentioned flavanthron paste was added so as to make the added quantity of flavanthron in the PVDF to become 0.2 part by weight. The two components were mixed for 30 minutes in a Henschel mixer having jacket temperature of 80° C.

For the sake of comparison, polyvinylidene fluoride powder containing no flavanthron was prepared by exactly the same manner as in the above.

Each of the above mentioned two kinds of polyvinylidene fluoride powder was spray-coated on the surface of an iron plate of 3-mm. thick and heated to a temperature of 280° C. to become molten, the operation of which was repeated for 5 times. After this powder-coating, the formed films of the respective polyvinylidene fluoride compositions were cooled at room temperature. The surface of each of the iron plates was found to have been coated with a PVDF film of about 1-mm. thick. The coated film of the polyvinylidene fluoride composition according to the present invention containing flavanthron exhibited shining gloss of enamel, while that of the ordinary polyvinylidene fluoride containing no flavanthron had no gloss at all.

When the sliced pieces of the internal portion of the coated films of both kinds of polyvinylidene fluoride compositions were observed through a polarization microscope, the PVDF composition according to the present invention was found to exhibit uniform spherulites of 1 micron or less in diameter throughout the film. However, the PVDF composition containing no flavanthron caused spherulites of a size ranging from 30 to 50 microns in diameter. The results of these observations are shown in FIGS. 1 and 2.

EXAMPLE 2

Both polyvinylidene fluoride powder containing flavanthron and that not containing the same were respectively extruded from an ordinary extruder at a die head temperature of 240° C., and cut into small pellets. From the pellets of both types of polyvinylidene fluoride powder, test pieces with notch and having thickness of 6.3 mm. (¼ inch) were prepared in accordance with ASTM Designation D–256–56 for measurement of Izod impact strength. It was found that the polyvinylidene fluoride composition containing flavanthron showed the strength of 15.5 kg. cm./cm., while that of the PVDF composition having no flavanthron was 10.1 kg. cm./cm.

Observation through a polarization microscope of sliced pieces of the internal portion of both test pieces presented the fact that the PVDF composition containing flavanthron produced uniform spherulites of 1 micron or less in diameter therethroughout, while the PVDF composition not containing the compound produced spherulites of a size ranging from 30 to 50 microns.

EXAMPLE 3

To 100 parts by weight of polyvinylidene fluoride powder having inherent viscosity $\eta_{inh}$ of 1.76 and obtained by the suspension-polymerization at 25° C., there was added 10 parts by weight of flavanthron powder, and the whole batch was mixed in a Henschel mixer for 30 minutes. The mixture was further kneaded in an extruder maintained at a temperature of 250° C. to 280° C. and extruded into pellets.

For the sake of comparison, pellets were also manufactured in the same manner as mentioned in the preceding with the exception that polyvinylidene fluoride does not contain flavanthron.

From the respective pellets thus produced, tubings of 50 mm. in outer diameter and 2 mm. thick were manufactured by an extruder heated to a temperature of 250° C. to 280° C.

The tubing manufactured from polyvinylidene fluoride containing flavanthron exhibited very fine crystal structure of 1 micron and below, while the tubing manufactured from polyvinylidene fluoride not containing flavanthron exhibited large spherulites of 30 to 50 microns.

EXAMPLE 4

A mixture of 97 mol percent of vinylidene fluoride and 3 mol percent of tetrafluoroethylene was emulsion-polymerized at a temperature of 80° C. After usual treatments of salting-out, rinsing, and drying, a co-polymer having inherent viscosity $\eta_{inh}$ of 1.33 was obtained.

To 100 parts by weight of this polyvinylidene fluoride copolymer powder, 0.01 part by weight of flavanthron was added. The mixture powder was subjected to direct compression-molding under the following conditions to produce a plate of 100 mm. long x 100 mm. wide x 10 mm. thick.

| | Min. |
| --- | --- |
| Preheating at 240° C. | 25 |
| Heating at 240° C. under pressure of 150 kg./cm.² G | 5 |
| Cooling in a cooling press | 30 |

For the sake of comparison, the plate of the same dimension as mentioned above was produced in exactly same manner as above from polyvinylidene fluoride powder not containing therein flavanthron.

Upon observing the crystal structure of the internal cross-section of the respective plates, it was found out that the plate made of polyvinylidene fluoride containing flavanthron had the crystals of less than 1 micron, while plate made of polyvinylidene fluoride not containing flavanthron exhibited spherulites of 10 to 20 microns.

NOTE

The term "inherent viscosity $\eta_{inh}$" used in Examples 1, 3, and 4 above designates the value obtained from the following equation.

$$\eta_{inh} = 1/C \ln(t/t_0)$$

where: $t_0$ denotes viscosity of dimethyl-formamide (at 30° C.); $t$ is viscosity of polymer in a solution of dimethyl-formamide (at 30° C.) at a concentration of 0.4 g./100 cc.; ln indicates the natural logarithm; and C is a constant of 0.4.

What we claim is:

1. Polyvinylidene fluoride composition of improved crystallinity and impact strength consisting essentially of: 100 parts by weight of vinylidene fluoride polymer selected from the group consisting of the homopolymer of vinylidene fluoride and copolymers containing therein at least 90 mol percent of vinylidene fluoride; and from 0.01 to 10 parts by weight of a crystal nucleating agent of the following structural formula and uniformly dispersed in said vinylidene fluoride polymer

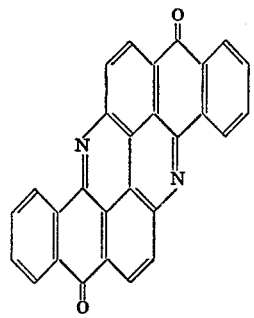

2. The composition according to claim 1, in which said crystal nucleating agent is flavanthron.

3. The composition according to claim 1, in which the content of said crystal nucleating agent is 0.2 part by weight.

References Cited

CA 62, 13304(e).

JAMES A. SEIDLECK, Primary Examiner

S. M. LEVIN, Assistant Examiner

U.S. Cl. X.R.

117—132 CF; 260—87.7, 92.1